Figure 1:
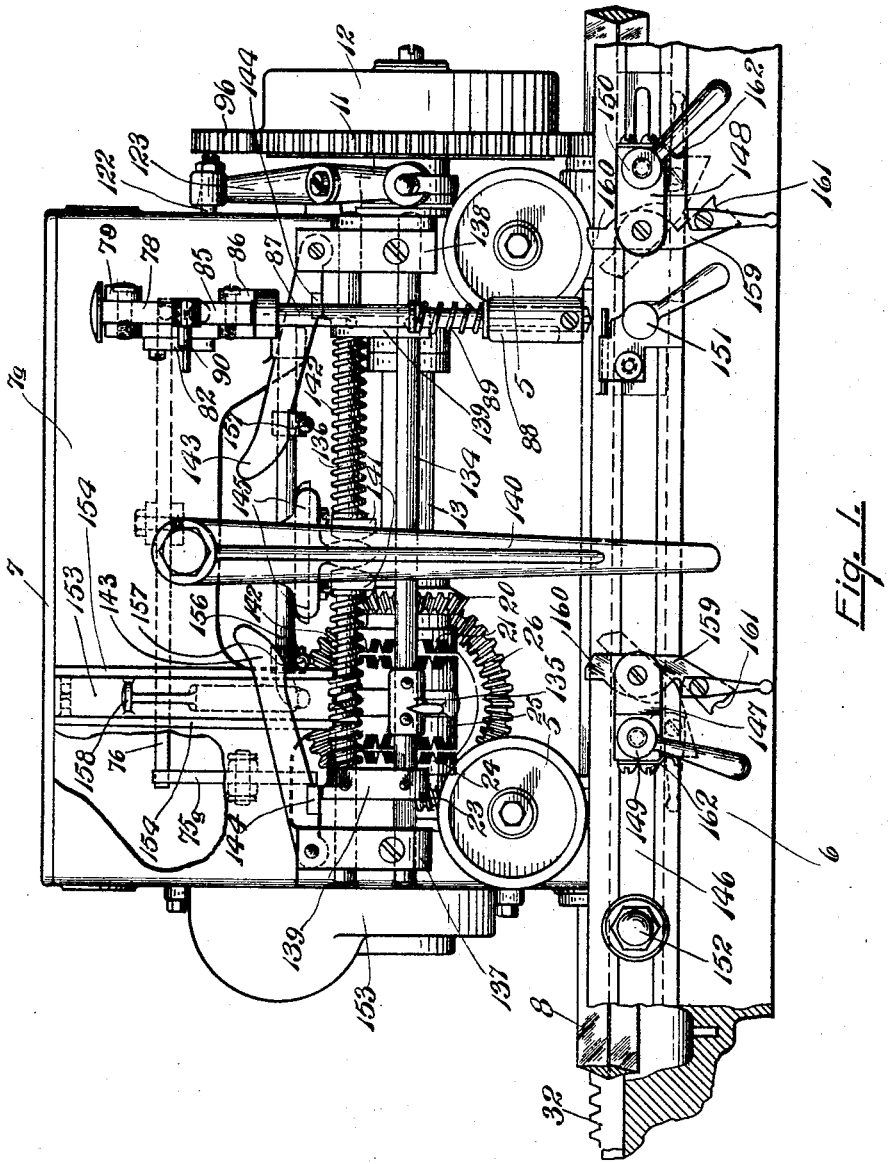

H. A. SHIELDS.
CUTTING AND FOLDING MACHINE.
APPLICATION FILED MAR. 19, 1915.

1,197,865.

Patented Sept. 12, 1916.
6 SHEETS—SHEET 1.

Witnesses
Howard H. Yarrington
Mae Pankin

Inventor
Harry A. Shields
By Moulton & Livrance
Attorneys.

H. A. SHIELDS.
CUTTING AND FOLDING MACHINE.
APPLICATION FILED MAR. 19, 1915.

1,197,865.

Patented Sept. 12, 1916.
6 SHEETS—SHEET 5.

Witnesses
Howard H. Garrington
Mae Rankin

Inventor
Harry A. Shields
By Moulton & Lurrance
Attorneys.

H. A. SHIELDS.
CUTTING AND FOLDING MACHINE.
APPLICATION FILED MAR. 19, 1915.
1,197,865.
Patented Sept. 12, 1916.
6 SHEETS—SHEET 6.
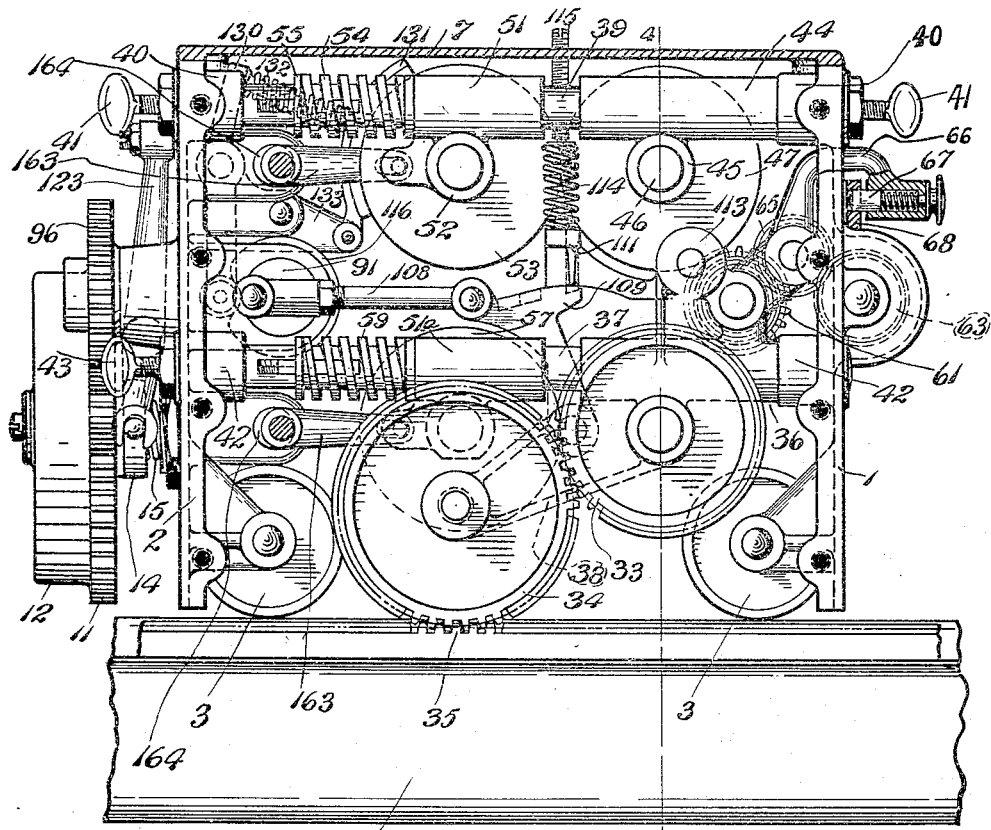

UNITED STATES PATENT OFFICE.

HARRY A. SHIELDS, OF GRAND RAPIDS, MICHIGAN.

CUTTING AND FOLDING MACHINE.

1,197,865.   Specification of Letters Patent.   Patented Sept. 12, 1916.

Application filed March 19, 1915. Serial No. 15,510.

*To all whom it may concern:*

Be it known that I, HARRY A. SHIELDS, a citizen of the United States of America, residing at Grand Rapids, in the county of Kent and State of Michigan, have invented certain new and useful Improvements in Cutting and Folding Machines; and I do hereby declare the following to be a full, clear, and exact description of the invention, such as will enable others skilled in the art to which it appertains to make and use the same.

This invention relates to a machine adapted to be used for cutting fabric in desired lengths and piling said lengths of fabric one above the other, the machine being especially designed to handle knitted fabrics used in the manufacture of underwear. In machines of this character, the fabric, knitted in pieces of great length, is fed into the machine and is cut into lengths of any desired dimension, the lengths being piled one above the other. The machine also contains means which, if the fabric is not to be cut will permit the folding thereof with any desired distances between folds, the only difference in this operation being that the fabric is not cut at the folds as before.

It is the object and purpose of the invention to provide a machine of this character containing a carriage operable back and forth between certain predetermined limits, which will receive a fabric and carry it through the carriage depositing it in lengths one above the other, either folding it at the ends of the lengths or cutting it as may be desired.

It is a further object of the invention to provide a machine which, while normally acting automatically, may be manually stopped at any portion of the travel of its carriage at will, and also one in which the cutting operation may be made to take place at any portion of the travel so that, if necessary, a defective piece of fabric may be removed, the carriage after the cut has been made, traveling to one limit of its movement before it again receives and delivers the fabric below it, whereby each of the lengths will have its ends directly above and in alinement with the ends of the other lengths of fabric in the pile.

Figure 2:
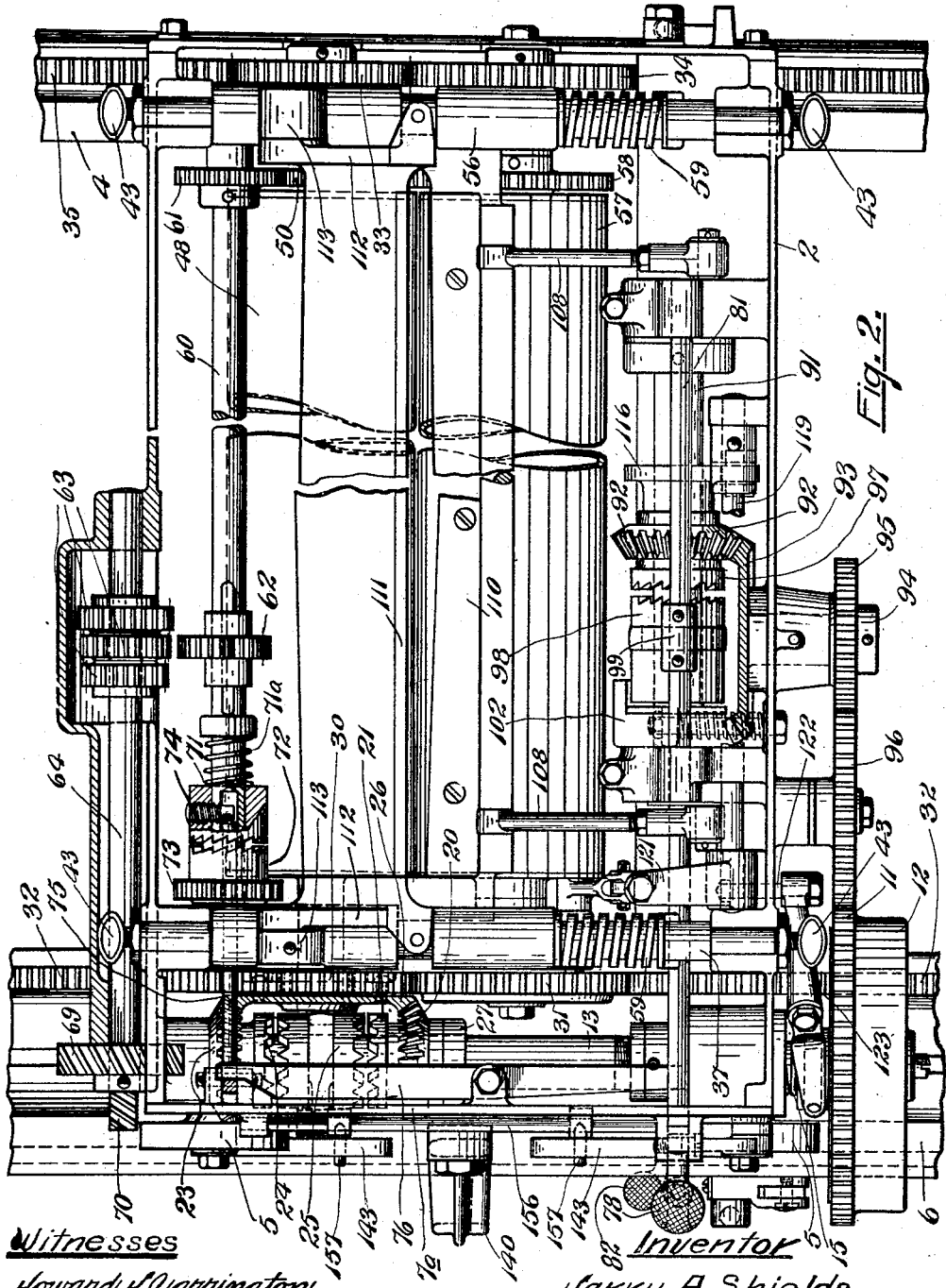
Figure 3:
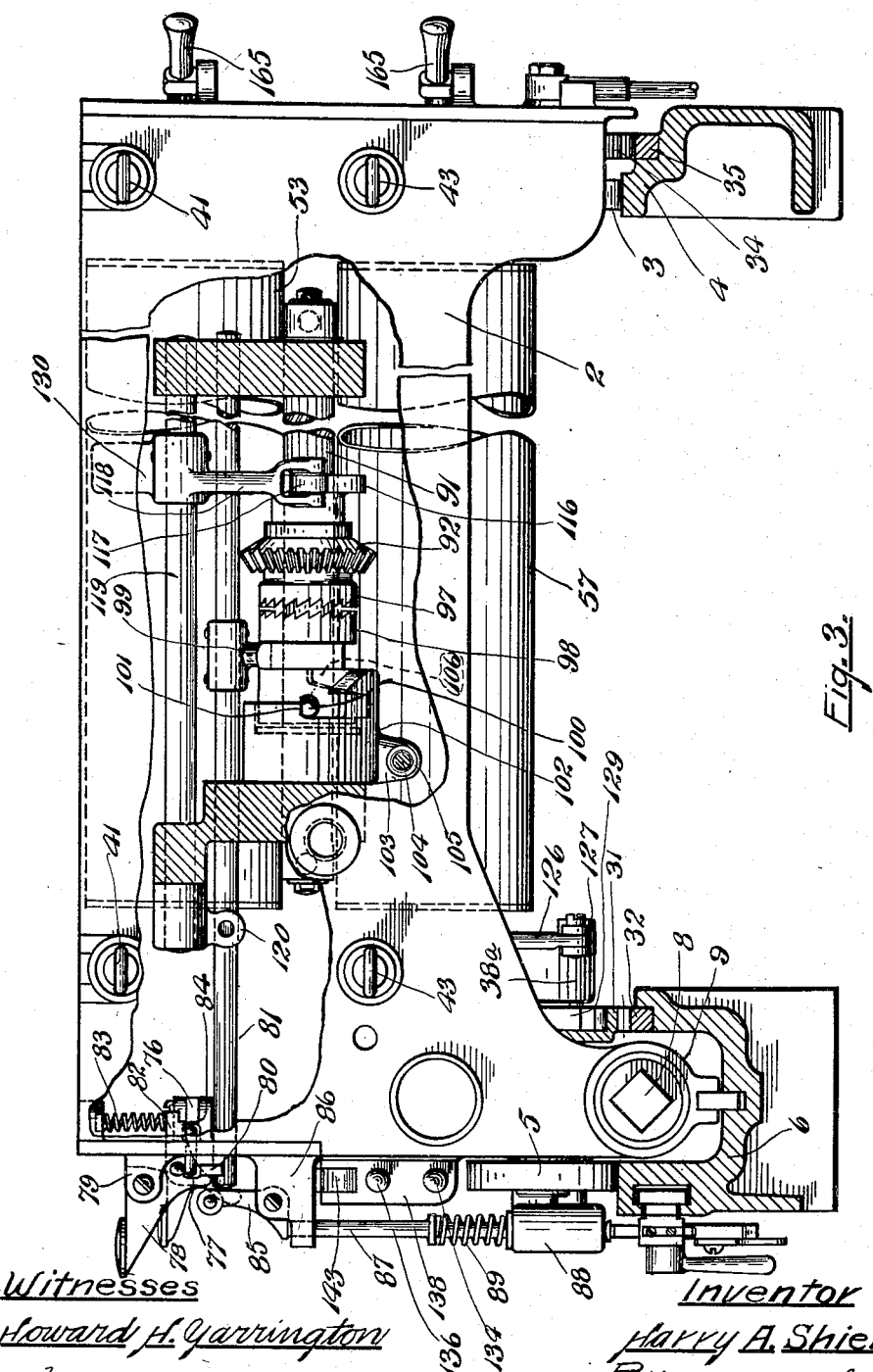
Figure 4:
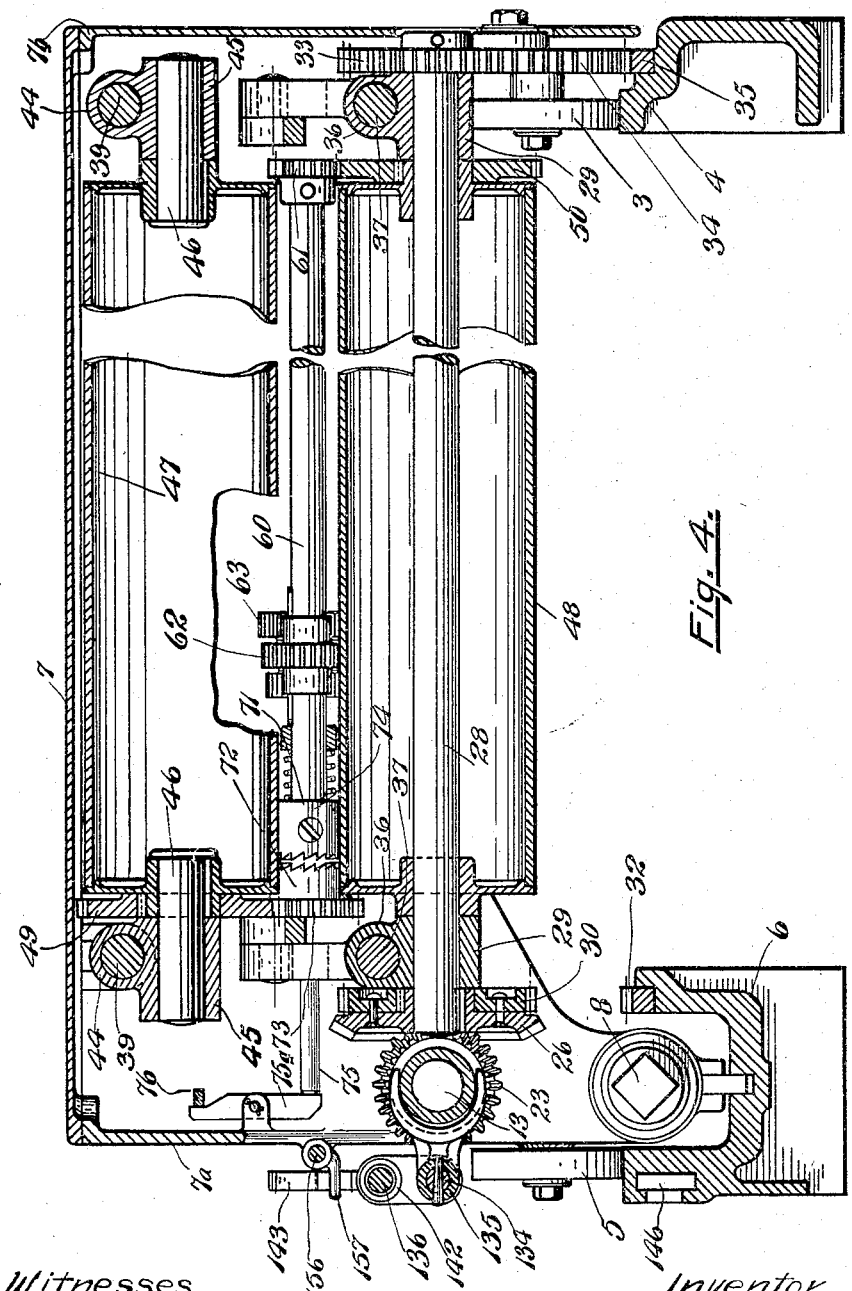
Figure 5:
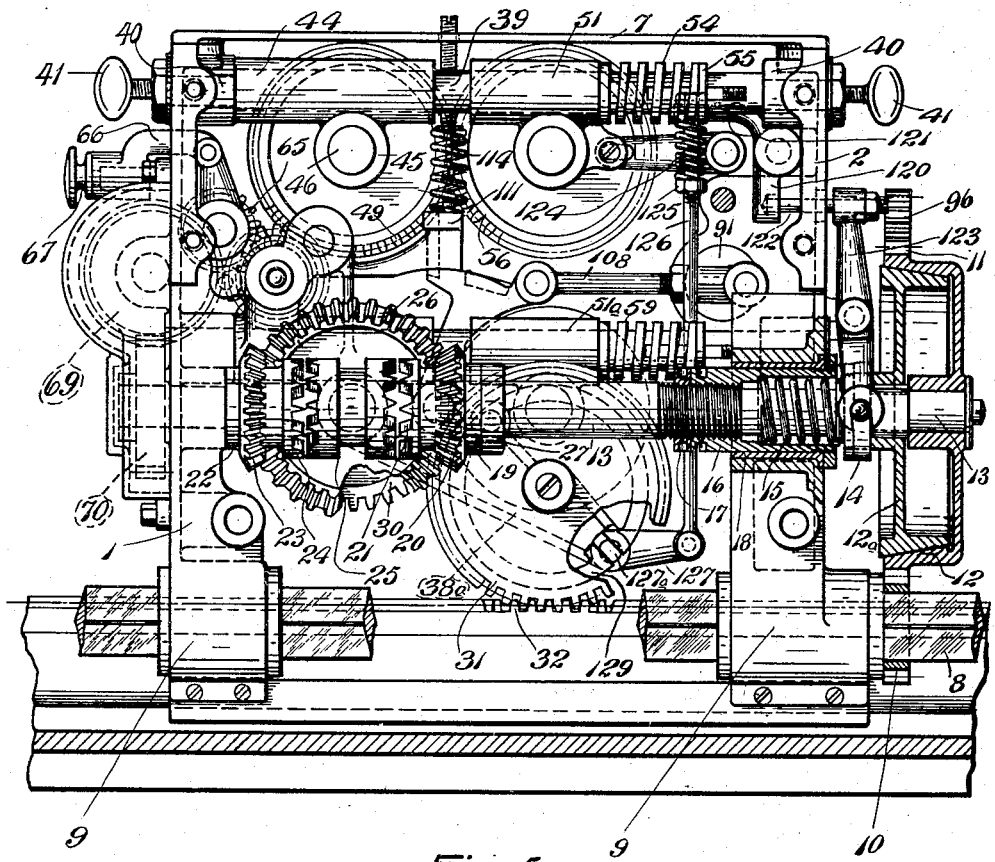
Figure 6:
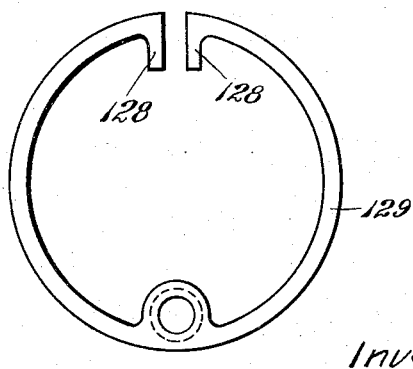

Further objects and purposes of the invention consist in new and improved means for driving the carriage in its travel; in new and improved construction for driving the rolls which receive the fabric; in novel and useful constructions for stopping the machine when a cut in the fabric is to be made; in new construction of cutting mechanism; and in various other novel and useful features of construction and operation, all of which will be apparent upon understanding being had of the embodiment of the invention disclosed in the accompanying drawings, in which;

Figure 1 is a front elevation of the machine. Fig. 2 is a plan view with the cover of the carriage and the upper set of rolls removed, various parts of the mechanism being broken away and shown in section to better disclose the construction. Fig. 3 is a view from one side of the machine, a part of the frame work of the carriage being broken away to disclose the mechanism. Fig. 4 is a vertical section taken substantially on the line 4—4 of Fig. 7. Fig. 5 is a front elevation of the machine with the front cover plate of the carriage and attached mechanism removed. Fig. 6 is an elevation of a brake band used in the machine. Fig. 7 is a view similar to Fig. 5 of the opposite end of the machine with the rear cover plate for the carriage removed to disclose the mechanism. Fig. 8 is a side elevation illustrating a detail of construction; Fig. 9 is a vertical section through an element of the mechanism disclosed in Fig. 8; and Fig. 10 is a section taken on line 10—10 of Fig. 1.

Like reference characters refer to like parts throughout the several views of the drawings.

In the construction of the cutting and folding machine I provide a carriage including side members 1 and 2 which on their inner sides and adjacent their rear ends carry wheels 3 bearing on a rail 4 forming a support for the carriage at its rear end. There are also provided wheels 5 at the front end riding on a rail 6 parallel to and spaced from the rail 4. A plate 7 is located at the top of and covers the space between side members 1 and 2 and with front and rear cover plates 7ª and 7ᵇ inclose the mechanism. Cover plates 7ª and 7ᵇ are secured in any suitable manner to the side members 1 and 2 which form the main supports for the mechanism within the carriage.

The front rail 6 is substantially U-shaped in cross section having the legs of the U extending upwardly. Between said legs, a power shaft 8, square in cross section, is located, it being understood that this shaft is of considerable length and may be driven from any convenient source of power. Sides 1 and 2 on their forward lower edges are extended in a downward direction and formed with bearings 9 adapted to slidably receive the shaft. Adjacent said bearing formed in the member 2 a pinion 10 is secured and is driven by the shaft 8, meshing with a gear 11 formed on the outer surface of the female member 12 of a clutch loosely carried on a shaft 13 which is supported by and lies between the sides 1 and 2 of the carriage. The male member 12$^a$ of the clutch is splined to shaft 13, a collar 14 on the shaft being forced against the member 12$^a$ by a strong coil spring 15 housed in the cylindrical housing 16 screwed on shaft 13 and retained in place by the locking collar 17. It will be apparent that the housing 16 and inclosed spring 15 rotate with the shaft 13, the housing being rotatable in a bushing 18 carried by a bearing formed integrally with the side member 2 of the carriage as shown.

Shaft 13 carries a loosely mounted collar 19 which is provided with an integral bevel pinion 20 between its ends, and one end of the collar is formed as a clutch member at 21. Adjacent the side 1 a similar collar 22 is similarly provided with a bevel pinion 23 and at one end with a clutch member at 24. Collars 20 and 22 are loosely mounted on the shaft 13 and spaced a distance apart with their respective clutch teeth extending toward each other. Splined to shaft 13 between the clutch members 21 and 24 is a two-faced clutch 25, each end having clutch teeth adapted to engage with the teeth at 21 or 24. In its central position as shown in Fig. 1, the member 25 is free of both of the collars. Pinions 20 and 23 each mesh with a large bevel gear 26 and are held in engagement therewith, collar 22 being held in position by engagement against member 1 while a collar 27 secured to shaft 13 holds the pinion 20 in mesh with gear 26.

Gear 26 is keyed to one end of a shaft 28 extending lengthwise of the carriage and parallel to the sides thereof, being supported in bearings 29. A spur gear 30 is rigidly connected to the bevel gear 26 meshing with an idle gear 31 which in turn has engagement with a rack 32 lying lengthwise of and secured to the upper end of the rear leg of the U-shaped rail 6. At its opposite end shaft 28 carries a gear 33 which meshes with an idle gear 34, it in turn engaging with a rack 35 lying lengthwise of and secured to the rail 4. It will be apparent from this construction that whenever shaft 13 is rotating and clutch 25 is engaged with either of the clutches 21 or 24, shaft 28 will be rotated, being driven in one direction when the engagement is with clutch 24 and in the opposite direction when the engagement is with clutch 21 and that the carriage will be traversed over the rails 4 and 6 by reason of the driving engagement between the shaft and the racks 32 and 35 secured to said rails. It will also be evident that by reason of the driving engagement between the shaft and each of the rails 4 and 6 both ends of the carriage will be positively driven and will move uniformly over the rails.

The bearings 29 heretofore described as supporting shaft 28 are formed integrally with sleeves 36 which are carried on transverse rods 37 spaced apart and located, respectively, toward the front and rear of the carriage. Integral with said sleeves are brackets 38 and 38$^a$ positioned, respectively, adjacent the rear and front of the carriage and provided with bearings for mounting the gears 34 and 31 heretofore described. The rods 37 are positioned in an horizontal plane adjacent the center of the carriage and directly above such rods are located similar rods 39, the ends of which lie in sockets formed in the projection 40 cast integral with the sides 1 and 2 of the carriage. It will be noted that rods 39 lie close to the top of the carriage and it is designed that they may be readily removed through slots extending to the upper edges of the sides 1 and 2, being retained in fixed position normally by screws 41 as shown. The cross rods 37 are similarly supported in studs 42 and are similarly held by suitable screws 43.

The upper rods 39 each support a sleeve 44, one end of which lies against a projection 40. On its underside each sleeve is provided with a bearing 45 adapted to rotatably support a short shaft 46 fixed in the end of a roll 47 which lies between and is rotatable with shafts 46. Roll 47 lies immediately above a similar roll 48 loosely mounted on the shaft 28 and at its front end has a gear 49 connected thereto while roll 48 is similarly provided with a gear 50 at its rear end. Rods 39 also are each provided with a second sleeve 51, each of which has bearings 52 underneath, between which is rotatably mounted a roll 53 which contacts with roll 47 and is pressed thereagainst by the compression springs 54 lying between the ends of sleeves 51 and collars 55 fixed on the rods 39. At its front end roll 53 carries a gear 56 which meshes with the gear 49 on the other upper roll 47.

Each of the lower transverse rods 37 in similar manner carries a sleeve 51$^a$, each of which has bearings providing a rotatable support for a roll 57 positioned below roll 53. Roll 57 contacts with the roll 48 heretofore described and has a gear 58 connected at its rear end which meshes with the gear 50 provided at the rear end of roll 48. Compression springs 59 on the rods 37 are likewise used to force roll 57 against roll 48.

From the construction thus far described it will be noted that two pairs of rolls are provided, one pair being above the other and that the upper rolls are connected by gears at their front ends so as to rotate together in opposite directions while the lower pair of rolls are similarly geared at their rear ends. A shaft 60 is supported in suitable bearings adjacent the side 1 and is located in a plane between the upper and lower pairs of rolls. Adjacent its rear end a pinion 61 is pinned to shaft 60 meshing with the gear 50 of roll 48. Between its ends a pinion 62 is slidably mounted on the shaft 60 and is adapted to be driven by any one of the three gears 63 fixed on shaft 64 through the medium of a pinion 65 carried by the bracket 66. This bracket is movable for a limited distance lengthwise of shafts 60 and 64 and, when properly positioned, pinion 65 will engage with one of the three gears 63 so that a transmission of movement may occur from shaft 64 to shaft 60, it being understood that the pinion 62 is always in engagement with pinion 65 and is also slidable on shaft 60 a limited distance with the movement of the bracket 66. Bracket 66 carries a spring pin 67 adapted to engage with one of three openings in a plate 68 secured to the side 1. It will be noted that pinions 63 vary slightly in size and number of teeth and that the relative rotation of shaft 60 with respect to shaft 64 will be greatest when the largest of the gears 63 is used to drive shaft 60. The construction described is a change speed arrangement for use with this mechanism, it being necessary with different kinds of fabrics that the relative rotation of the rolls be varied slightly with respect to the travel of the carriage on the rails 4 and 6. Shaft 64 is driven by means of spiral gears 69 and 70 secured respectively to the shafts 64 and 13. It will be evident from this construction that whenever the shaft 13 is rotated the gear 61 will drive the lower set of rolls.

A clutch member 71 splined on the shaft 60 adjacent its forward end is normally forced by the spring 71ª toward a companion clutch member 72 loosely mounted at the forward end of shaft 60. A pinion 73 formed integrally with member 71 meshes with the gear 49 fixed at the front end of roll 47. When the clutch members on collars 71 and 72 are in engagement the rotation of shaft 60 causes the rotation of the upper pair of rolls but upon disengagement of the clutches the upper pair of rolls stops, though there may be at the same time a continued rotation of the lower rolls. A pin 74 is threaded into member 71, its inner end projecting into the opening shown as bored in shaft 60. A rod 75 passes through clutch member 72 contacting at its rear end with the pin and at its front end bearing against the lower end of a lever 75ª pivotally mounted on the front cover plate 7ª, said lever at its upper end being located in front of an end of a lever 76. Lever 76 is pivotally mounted between its ends to the front plate extending transversely of the carriage toward the side 2 thereof but terminating a distance from the side. A pin 77 passes through the front plate 7ª and bears at its rear end against the free end of lever 76, the front of the pin contacting with an arm of a bell crank lever 78 pivotally mounted between lugs 79 cast integral with the front plate and adapted to be manually operated to project the pin through the plate and force the free end of lever 76 to the rear. The downwardly extending arm of lever 78 projects a distance below pin 77 and bears against a block 80 fixed at one end of rod 81 mounted a short distance from and parallel to the side 1 of the carriage. At one side of the lever 78 a lever 82 is pivotally mounted having an end extending through the front plate 7ª and normally lying above lever 76, being pressed thereagainst by the coil spring 83 and having a notch 84 so that when lever 78 is manually operated causing the consequent inward movement of the free end of lever 76, the end of arm 82 drops in front of lever 76 and holds it from returning under the influence of spring 71ª as will be readily apparent. It will therefore be clear that the manual operation of bell crank lever 78 causes the disconnection of the clutch teeth on collars 71 and 72 together with the simultaneous inward movement of rod 81 and that the notch 84 at the end of lever 82 automatically receives the lever 76, holding the clutch members disengaged.

At a distance below lever 78 a bell crank lever 85 is pivotally mounted in a bracket 86 cast integral with the front plate 7ª, said lever having an upwardly extending arm lying against the front end of rod 81 and immediately in front of the downwardly extending arm of bell crank lever 78. Lever 85 is adapted to be operated on upward movement of the vertical rod 87 mounted between and held in the bracket 86 and the cylindrical housing 88. A coil spring 89 surrounds the rod and serves to cushion the movements of the rod. If the rod 87 be carried upwardly it acts on the lever 85 causing the inward movement of rod 81, at the same time engaging with the lower end of lever 78 forcing pin 77 inwardly while a pin 90 carried by the vertical arm of the lever 85 engages with lever 82 to elevate its inner end and free the end of lever 76 from lever 82, whereby on the release of rod 87 on its return to normal position lever 76 again comes to its normal position with the end of lever 82 resting thereon, again permitting the engagement of the clutch teeth on collars 71 and 72.

A shaft 91 mounted parallel to and a short distance from the side 2 of the carriage having support in suitable lugs cast integral with said side, has loosely mounted thereon a bevel pinion 92 which meshes with a bevel gear 93 fixed to the inner end of a short shaft 94, supported by and extending through the side 2 and carrying at its outer end a spur gear 95 which is driven by the gear 11 through the idle gear 96 as shown in Fig. 2. A clutch 97 is formed integral with gear 92 adapted to have engagement with a clutch member 98 splined on shaft 91. Normally the clutch members are not in engagement and shaft 91 remains at rest. A yoke 99 engages with the collar 98 and is connected to rod 81 so that whenever this rod is given inward longitudinal movement as previously described the clutch members at 97 and 98 engage and the shaft 91 is rotated. A pin 100 extends from the clutch member 98 and is normally seated against the shoulder 101 in the stop member 102 formed as a sleeve and loosely carried on shaft 91. On its underside member 102 has an integral downwardly extending arm 103 perforated to receive a bolt 104 lying between and supported by said arm and the side 2 of the carriage as shown in Fig. 8, a coil spring 105 under compression being positioned between the arm and side 2. When the rod 81 and the connected collar 98 are moved toward the rear, pin 100 is disengaged from shoulder 101 and rotates with the collar along the rear edge of member 102 until it comes to finger 106 which engages the pin and carries it through a cam action of the inclined side of the finger and of a side of slot 107 toward the front of the carriage, thereby serving to draw the clutch 98 from its companion clutch member 97, thus disconnecting the power that drives shaft 91. Pin 100 in connection with the stop member 102 therefor acts to permit one revolution only of the shaft 91 and as the revolution is completed the pin strikes against shoulder 101, the shock of the impact being absorbed by the spring 105.

A pair of spaced apart rods 108 are eccentrically mounted at their ends to the ends of shaft 91 and extend over the lower roll 57 being connected to brackets 109 pivotally mounted at their ends on the brackets 38 and 38ª heretofore described and carrying a shearing blade 110 therebetween, which blade lies in parallel relation to the rolls and is adapted to pass under a shear blade 111 supported by and between the brackets 112 pivotally mounted to lugs 113 as shown.

The upper brackets 112 overlap the brackets 109 at the ends of the shear blades and are pressed thereagainst by coil springs 114, the tension of which is regulated by set screws 115. As the shaft 91 makes its single revolution, the blade 110 passes under blade 11 and returns to its normal position in this manner severing any fabric which may be held between the rolls. It will be noted that the cutting edge of blade 110 is slightly inclined from its center toward both ends thereof and in the same manner the center of blade 11 is in a plane lower than at its ends, whereby the cut will begin at the ends of and will be finished at the center of the blades, shearing action being provided which makes an especially clean cut of the fabric.

A cam 116 is fixed on the shaft 91 and rotates therewith having a depression in which is seated the roll 117 mounted at the lower end of arm 118 secured to a shaft 119 mounted above shaft 91 and adjacent the side 2. At the forward end of shaft 119 a bell crank lever having a downwardly extending arm 120 and a horizontal arm 121 is connected. Arm 121 engages with one end of a pin 122 which passes through the side 2 of the carriage and bears at its other end against the upper end of a lever 123, pivotally mounted on the outside of side 2 at its lower end provided with a yoke having engagement with the collar 14. Arm 121 bears against a coil spring 124 located between said arm and a nut 125 fixed to vertical rod 126 which at its upper end passes through the arm 121 and at its lower end is pivotally connected to a member 127 pivotally mounted in a bearing at the lower end of bracket 38ª and carrying a rectangular projection 127ª extending forward into the space between the adjacent ends 128 of the brake band 129, which band is held within an annular depression formed on the rear side of gear 31 as fully illustrated in Fig. 3. With the beginning of the rotation of shaft 91 cam 116 forces arm 118 outwardly giving shaft 119 a partial rotation carrying arm 120 in an outward and arm 121 in a downward direction, the effects of which are to operate arm 123, thus disconnecting clutch member 12ª from the member 12 and simultaneously spreading the end of the brake band so that the band will engage against the gear 31 and tend to stop its movement. The disconnection of the clutch members 12ª and 12 disconnects the power from shaft 13 so that the carriage is stopped from movement except what may come from its own momentum and it is to overcome this movement that the brake band is operated, it being designed that as soon as shaft 91 starts to rotate and operate the cutting mechanism the carriage shall be immediately stopped from any movement. It will also be noted as heretofore described that the rod 81 cannot be given its rearward movement without simultaneously disconnecting clutch members 71 and 72 and stopping the rotation of the upper rolls. To prevent any rotation of said rolls under the influence of their own momentum, an arm 130 is formed integrally with the arm 117 or in any other manner suitably connected to the shaft 119 and extended in an upward direction therefrom so that it will be carried toward the roll 53 as soon as the rotation of the shaft 91 begins, forcing the brake 131 against the roll by compressing the coil spring 132 interposed between the arm and said brake. The brake is pivotally mounted on any suitable support 133 which may be a lug cast integrally with the side 2 of the carriage.

A rod 134 is positioned horizontally at the front of the machine and carries a yoke member 135 which connects with the double faced clutch 25 heretofore described. Another rod 136 lies immediately above and parallel to rod 134, both rods being slidably mounted in bearing blocks 137 and 138 positioned adjacent the side edges of and connected to the front plate 7ª. The rods 134 and 136 are connected together by vertical ties 139 spaced substantially equal distances from the blocks 137 and 138 when the rods are in central position with the clutch 25 free from both clutches 21 and 24. A handle 140 is pivotally mounted at its upper end to the front plate 7ª and extends in a downward direction carrying a lug on its rear face which passes between cams 141 slidably mounted on the rod 136. Coil springs 142 surround the rod 136 being located between said cams and the members 139, and are of equal length and strength tending normally to keep the parts at the central position shown in Fig. 1. To each of the blocks 137 and 138 a dog 143 is pivotally mounted, these dogs extending toward each other and each being provided at its under edge with a hardened piece 144 adapted in the central position of the parts to ride upon the members 139. If the handle 140 is operated in either direction, for instance, to the right of Fig. 1, it will be evident that rods 134 and 136 will be carried to the right and the member 139 at the left will pass beyond the edge of its associated piece 144, permitting the dog 143 to drop, holding the rods in the position to which they have been operated with clutch 25 engaging clutch 21. If the handle is now operated in the opposite direction there will be no movement of rods 134 and 136 because of the stop imposed by engagement of member 139 against the piece 144 so that clutches 25 and 21 will remain in engagement until the lug 145 formed on handle 140 engages under the end of the dog 143 and elevates it sufficiently to free member 139 whereupon the rods will be instantly carried in the opposite direction causing an engagement of clutch 25 with clutch 24 and carrying member 139 to a position where the piece 144 associated with it will drop behind and retain the parts in such position. It will be apparent therefore that by proper operation of the handle 140 in either direction the clutch 25 may be made to engage with either of clutches 21 or 24 to drive the carriage as heretofore described.

The automatic reversal of the movement of the carriage is effected by stops secured to and projecting outwardly from the front rail 6 and lying in the path of movement of the lower end of the handle 140. A T-slot 146 is cut in the rail 6 and in it are slidably located members 147 and 148 which may be retained in any desired position to which they are adjusted by tightening the handles 149 and 150. Also carried in this T-slot are other members having stops 151 and 152 extending forwardly therefrom. It will be clear that if the carriage is traveling in either direction on the rails, for instance, toward the left in Fig. 1, when the end of arm 140 strikes the stop 152 it will be carried to the right and will elevate dog 143 at the right hand side of the carriage at the same time compressing the right hand spring 136 so that clutches 24 and 25 will be disconnected and the clutches 25 and 21 engaged reversing the movement of the carriage and permitting it to move in the opposite direction until such time as the handle strikes stop 151. It will also be evident that if no movement is given to the rod 81 during this travel of the carriage, any fabric fed into and between the upper rolls and discharged by the lower rolls will be folded in lengths underneath the carriage as it runs back and forth on the rails, it being understood that any suitable table may be provided to receive the material as it is discharged from the machine. It is also clear that by proper adjustment of the stops 151 and 152 the material may be folded with the distance between folds of any desired length.

It is at times desirable that during the operation of the machine the carriage be stopped in its travel. To effect this, a member 153 is slidably mounted between vertical guides 154 on the front of plate 7ª and has a rear extension 153ª contacting with the rearwardly turned end 155 of the rod 156 which is mounted on the front in bearings and adapted to turn on its longitudinal axis. Two pins 157 are secured to rod 156 and lie one under each of the dogs 143. An operating handle 158 is connected with the member 153 and if at any time it is desired to stop the movement of the carriage, said handle may be forced downwardly against the tension of spring 158ª causing rod 156 to rock and elevate both pins 157 whereupon both of the dogs 143 will be lifted, freeing rods 134 and 136 which return to normal central position and carry the clutch 25 to its central position where it is disengaged from both of the clutches 21 and 24.

On each of members 147 and 148 heretofore described, an irregular shaped member 159 is pivotally mounted and is weighted so that normally its beveled upper end 160 will lie vertical as shown in full lines in Fig. 1. It may, however, be carried to the position shown in dotted lines in Fig. 1 and held through the medium of a notch 161 in the lower end of the member, having engagement by a spring 162 as shown. In the full line position of these members the beveled upper ends thereof lie in the path of the lower end of rod 87 so that when the carriage moves and this rod passes over either of the ends 160, it will be elevated, causing the inward longitudinal movement of rod 81 as heretofore described with the consequent operation of the cutting mechanism, and stopping of movement of the carriage and upper pair of rolls. On return of the carriage the members 159 will yield to permit the passage of the rod 87 without raising it. It is therefore clear that by the provision of members 159 the automatic operation of the cutting mechanism may be effected and, if at any time it is not desired that this operation be effected, all that is necessary is to carry the members 159 to their dotted line position shown in Fig. 1 whereupon the fabric will be folded and not cut.

With the foregoing description of the construction of the machine in mind its operation will be readily apparent. The fabric is carried to and between the upper rolls passing downwardly therefrom between the lower rolls. The operator of the machine, by grasping the handle 140 may start it to travel in either direction and the rolls will carry the material through the machine to any suitable supporting table placed underneath it, members 147 and 148, 151 and 152 being adjusted the proper distance apart for the desired length of goods. When the travel of the carriage brings rod 87 into contact with the upper end 160 of either member 159, the movement of the upper set of rolls together with that of the carriage automatically stops while simultaneously therewith the cutting mechanism is started and the fabric is severed as the shaft 91 makes its one revolution. Immediately upon completion of this revolution the carriage again starts moving. It will be noted that the lower rolls during the time that the cutting mechanism is operating have been turning and have carried the severed end of the fabric through the machine. The stops 151 and 152 are so positioned with reference to member 159 and the handle 140 of the carriage that the reversing movement will take place a short time after the severing of the goods has been effected so that the end of the fabric will have had time to be fed into the lower rolls and be deposited immediately above the end of the length of fabric next below, as the carriage starts on its return movement, this operation being continued at each end of the travel of the carriage so long as the fabric is fed into the machine. When the end of the length of fabric is reached the operator by grasping the handle 158 may bring the carriage to rest, and start with a new length.

At times, in the length of knitted fabric there will be defective pieces which it will be desired to cut out. The operator on noting this defective piece can gage about where it will come in the fabric after it has passed through the machine and by manual operation of the lever 78 stop the carriage and operate the cutting mechanism. Suppose this should occur when the carriage had made but a small portion of its travel in one direction. As heretofore described, when the manual operation of the rod 81 to start the cutting mechanism in motion is resorted to, lever 82 engages with lever 76 and holds it in position such that the upper rolls are not turned. Accordingly, until the carriage reaches a point where the rod 87 engages with a member 159, no further feeding of the fabric into the machine will take place owing to the stopping of the upper rolls, but as soon as rod 87 has been raised causing the pin 90 carried by lever 85 to disengage the inner end of lever 82 from the lever 76, the fabric again is fed into the machine and on the return movement of the carriage, the end of the fabric will lie in alinement with the ends of the other lengths beneath it on the table.

Sleeves 51 and 51ª have connected thereto rods 163 which at their outer ends are mounted eccentrically on shafts 164 supported by and extending lengthwise of the carriage parallel to the side 2. Operating handles 165 are provided at the rear ends of shafts 164 by means of which they may be turned through a partial revolution carrying sleeves 51 and 51ª toward the side 2 and withdrawing rolls 53 and 57 from the rolls 47 and 48. This operation may be manually performed at will when it may be desirable to stop the machine and withdraw the fabric entirely therefrom in which case the movement of the rolls 53 and 57 from contact with their companion rolls may be necessary.

Many changes in minor detail may be resorted to without departing from the invention, the disclosure made is accordingly not to be considered in any sense as limiting the invention to any one specific construction. The invention is defined in the appended claims and all modifications of structure falling within their scope are to be considered as comprehended within this invention.

I claim:—

1. In a machine of the character described, supporting rails, a reciprocable carriage mounted on the rails, two pairs of rolls carried by the carriage one above the other, means for driving the rolls, cutting mechanism mounted on the carriage, means for operating the cutting mechanism at each traverse of the carriage, and means for stopping the carriage and the upper pair of rolls while the cutting mechanism is in operation, the movement of the lower rolls continuing during said cutting operation.

2. In combination, supporting rails, a reciprocable carriage mounted on the rails, two pairs of rolls carried by the carriage one above the other, means for driving the carriage and rolls, cutting mechanism mounted on and carried by the carriage, means for operating the cutting mechanism at each traverse of the carriage, means for disconnecting the driving means from the carriage and upper pair of rolls simultaneously with the connection thereof with the cutting mechanism, brakes, and means to operate the brakes to stop the carriage and upper set of rolls simultaneously with the disconnection of the driving means therefrom.

3. In combination, a reciprocable carriage, upper and lower pairs of feed rolls carried by the carriage, a shear blade located between the pairs of rolls, a shear blade movably mounted adjacent said first blade, means to drive the carriage, means to drive the rolls, means connected with the second shear blade for movably operating it, said means being normally at rest, and means for simultaneously disconnecting the driving means from the carriage and the upper pair of rolls and connecting it with the means for operating said second shear blade.

4. In combination, a carriage, tracks below and at the front and rear of the carriage on which it moves, upper and lower pairs of rolls mounted in the carriage above the tracks, means to drive the carriage back and forth on the tracks, cutting mechanism normally at rest operable between the rolls, means to drive the carriage and rolls, and means to set the cutting mechanism in motion and simultaneously stop the movement of the carriage and the upper pair of rolls while the lower pair of rolls continues in motion.

5. In combination, a carriage, upper and lower pairs of rolls mounted in the carriage, tracks supporting the carriage, means to move the carriage back and forth over the tracks, means to drive the rolls, cutting mechanism normally at rest operable between the rolls, means to set the cutting mechanism in motion and simultaneously positively stop the movement of the carriage and upper set of rolls, and means for automatically stopping the cutting mechanism and releasing the carriage and upper rolls upon completion of a predetermined operation thereof.

6. In combination, a carriage, rails supporting the carriage at the front and rear, upper and lower pairs of rolls mounted horizontally in the carriage, means to drive the carriage positively at both front and rear over the rails, means to drive the rolls, a cutting member normally at rest mounted between the pairs of rolls, means to give said cutting member a single reciprocatory movement between the rolls, means to set said means in motion, and means for stopping the movements of the carriage and upper set of rolls during the action of the cutting member, the movement of the lower rolls continuing independent of the movement of the carriage, upper rolls or cutting mechanism.

7. In combination, a carriage, rails supporting the carriage, means to drive the carriage back and forth over the tracks, means to automatically reverse the movements of the carriage at predetermined points of its travel on the rails, upper and lower pairs of rolls mounted in the carriage, means to drive the rolls, a cutting mechanism normally at rest located between the rolls, means to set the cutting mechanism in motion, means to automatically stop said cutting mechanism on completion of a predetermined operation thereof, and means automatically stopping the carriage and upper rolls while the cutting mechanism is in motion, said means including brakes operating against the carriage driving means and an upper roll when the cutting mechanism is in motion.

8. In combination, a support, a reciprocable carriage on the support, means for reversing the movement of the carriage, upper and lower pairs of feed rolls on the carriage, a shear blade positioned between the pairs of rolls, a second shear blade, a shaft normally at rest, arms eccentrically connected to the shaft and to the second shear blade, means to give the shaft a single rotation and means stopping the movements of the carriage during the rotation of said shaft.

9. In combination, a support, a reciprocable carriage on the support, means for driving the carriage back and forth on the support, upper and lower pairs of rolls carried by the carriage, a shear blade positioned between the pairs of rolls, a second shear blade, a shaft located at one side of and parallel to and between the said pairs of rolls, arms eccentrically mounted at the ends of the shaft and connected with the second shear blade, a clutch member loosely mounted on the shaft, means to drive said loose clutch member, a second clutch member splined on the shaft, means to engage the clutch members with each other, and means automatically disengaging said loose clutch member on completion of a single revolution thereof.

10. In combination, a support, a reciprocable carriage, means for driving the carriage back and forth on the support, upper and lower pairs of rolls carried by the carriage, a shear blade positioned between the pairs of rolls, a second shear blade, a shaft located at one side of parallel to and between the said pairs of rolls, arms eccentrically mounted at the ends of the shaft and connected with the second shear blade, a clutch member loosely mounted on the shaft, means to drive said loose clutch member, a second clutch member splined on the shaft, means to engage the clutch members, means automatically disengaging the second clutch member from the first clutch member on completion of a single revolution of said first clutch member, and means for stopping the movement of the carriage while the said clutch members are engaged.

11. In combination, spaced apart rails, a carriage movably mounted thereon, a shaft extending lengthwise of the carriage above the rails, means to drive the shaft, gearing connections between each end of the shaft and the rails, and means to reverse the drive of the shaft at predetermined points of the travel of the carriage on the rails, substantially as described.

12. In combination, spaced apart supporting rails, a carriage movably mounted on the rails, a shaft extending lengthwise of the carriage, gearing connections between the shaft and each of the rails for moving the carriage positively at each end over the rails, a roll loosely mounted on the shaft, a second roll parallel to and contacting with the first roll, means to drive the shaft, means to reverse the drive of the shaft at predetermined points of the travel of the carriage with respect to the rails and means to drive the rolls continuously in a single direction irrespective of the movements of the carriage and shaft.

13. In combination, supporting rails, a reciprocable carriage mounted on the rails, a shaft extending lengthwise of the carriage, gearing connections between the shaft and each of the rails, a roll loosely mounted on the shaft, a second roll parallel to and contacting with said loose roll, gearing connections between the said rolls at one end, a second shaft located above and at one side of the rolls, means to drive said second shaft continuously in one direction, gearing connections between the shaft and to the rolls, and means to reverse the drive of the first shaft at predetermined points of the travel of the carriage on the rails.

14. In combination, supporting rails, a carriage mounted to traverse the rails, a pair of rolls mounted in the lower portion of the carriage, gearing connections between the rolls at one end, a shaft extending lengthwise of the carriage, means to drive the shaft continuously in one direction, means for driving the rolls from said shaft, a pair of rolls mounted in the carriage above the first pair, gearing connections between said rolls at one end opposite the similar connections of the lower rolls, means to drive said rolls from the shaft, means to drive the carriage back and forth over the rails and means to reverse the movement thereof at predetermined points of its travel in said rails.

15. In combination, supporting rails, a carriage mounted to traverse the rails, means to drive the carriage over the rails, means to reverse the movement of the carriage at predetermined points in its travel, upper and lower pairs of rolls mounted in the carriage, a shaft lying lengthwise of the carriage at one side of and between the rolls, means to drive the shaft continuously in one direction, connections between the shaft and all of the rolls for driving them, and means for rendering the connections between the shaft and upper rolls inoperative whereby said upper rolls may be stopped while the shaft and lower rolls continue in motion.

16. In combination, supporting rails, a carriage mounted to traverse the rails, means to reverse the movement of the carriage at predetermined points in its travel, upper and lower pairs of rolls mounted in the carriage, a shaft lying lengthwise of the carriage at one side of and between the rolls, means to drive the shaft continuously in one direction, connections between the shaft and the lower pair of rolls for driving them continuously with the shaft, separable connections normally in engagement between the shaft and upper pair of rolls, a cutting mechanism normally at rest, and means to simultaneously set the cutting mechanism in operation and separate the connections between the shaft and upper rolls.

17. In combination, supporting rails, a carriage on the rails, means driving the carriage over the rails, means to reverse the travel of the carriage at predetermined points of its travel, two pairs of rolls carried by the carriage one above the other, means for driving the rolls, a cutting mechanism mounted in the carriage, means normally at rest for operating the cutting mechanism, a device on the carriage associated with said means adapted to connect it with the carriage driving means when operated, and adjustable members on one of the rails for automatically operating the said device when it comes into contact therewith.

18. In combination, supporting rails, a carriage on the rails, means for driving the carriage over the rails, means to reverse the travel of the carriage at predetermined points of its travel, two pairs of rolls mounted in the carriage, one above the other, connections between the carriage driving means and the lower pair of rolls for driving them continuously in one direction, separable connections between the carriage driving means and the upper pair of rolls, a cutting mechanism carried by the carriage, means normally at rest for operating the cutting mechanism, a device on the carriage adjacent one of the rails, members adjustably mounted on the said rail against which said device engages as the carriage travels back and forth, means whereby the movement of said device connects the carriage driving means with the operating means for the cutting mechanism to operate it, means interposed between the device and said separable connections to separate them and stop the upper pair of rolls when the device is moved, and means to disconnect the driving means from the carriage simultaneously with the operation of the cutting means.

19. In combination, supporting rails, a carriage movably mounted on the rails, means for driving the carriage over the rails, means for reversing the movement of the carriage at predetermined points of its travel on the rails, upper and lower pairs of rolls in the carriage, means to drive the rolls, a cutting mechanism normally at rest, a device carried by the carriage positioned adjacent one of the rails, members adjustably connected to said rail for operating the device as the travel of the carriage carries it to the members, means interposed between the device and cutting mechanism, and between the device and the driving means for the upper pair of rolls for setting the cutting mechanism in operation and simultaneously disconnecting the upper pair of rolls from the driving means therefor, and means disconnecting the carriage from its driving means while the cutting mechanism is in operation.

20. In combination, a reciprocable carriage, upper and lower pairs of rolls, carried by the carriage, means to drive the carriage, a shaft, driving connections between the shaft and lower pair of rolls, a clutch member loosely mounted on the shaft, driving connections between the clutch member and upper pair of rolls, a second clutch member splined on the shaft, a spring yieldingly holding the clutch members in engagement, means to drive the shaft, a rod engaging with the second clutch member, a lever for operating the rod, a device carried on the front of the machine, connections between said device for actuating the lever to disengage the clutch members, and means to automatically operate the device at predetermined points of the travel of the carriage.

21. In combination, supporting rails, a carriage mounted on the rails, means to drive the carriage, means to reverse the movement of the carriage at predetermined points in the travel thereof, upper and lower pairs of rolls mounted in the carriage, means to drive the rolls, manually operated means to stop the upper pair of rolls at any desired point of the travel of the carriage between its extremes of movement on the rails, and means to automatically connect said upper rolls with the driving means therefor as the carriage approaches an extreme position on the rails.

22. In combination, a carriage, supporting rails therefor, means to drive the carriage over the rails, cutting mechanism including a relatively fixed shear blade and a relatively movable shear blade carried by the carriage, a shaft normally at rest, arms eccentrically mounted in the shaft and connected to the movable shear blade, means to connect the driving means with said shaft, a cam on the shaft, a lever operable by the cam and means operated by the cam and means operated by the lever to disconnect the driving means from the carriage.

23. In combination, a carriage, supporting rails therefor, means to drive the carriage over the rails including a driven shaft on the carriage and gearing connections therebetween and the rails, cutting mechanism including a shaft normally at rest carried by the carriage, means to connect the shaft with the driving means, a cam on the shaft, a lever operated by the cam, a clutch interposed in the driving means for the carriage, means actuated by the lever to disconnect the clutch parts and interrupt the drive of the carriage, a brake, and means actuated by the lever to force the brake against the said gearing connections to positively stop the travel of the carriage while the cutting mechanism is operating.

24. In combination, a carriage, supporting rails therefor, means to drive the carriage over the rails, cutting mechanism including a shaft normally at rest carried by the carriage, a clutch member loosely mounted on the shaft, gearing connections between the clutch member and the driving means for the carriage, a second clutch member splined to the shaft, a rod projecting to the front of the carriage and connected with the said second clutch member, means to actuate the rod to connect the clutch members, a cam on the shaft, a lever operated by the cam, a clutch interposed in the driving means for the carriage, and means operated by the said lever to separate the clutch parts and interrupt the drive of the carriage while the shaft is in operation.

25. In combination, a carriage, supporting rails therefor, means to drive the carriage over the rails, cutting mechanism including a shaft normally at rest carried by the carriage, a clutch member loosely mounted on the shaft, gearing connections between the clutch member and the carriage driving means, a second clutch member splined to the shaft, a pin projecting therefrom, a stop member supported by the carriage and loosely surrounding the shaft, a shoulder on the stop member engaged by the pin, a rod connected to the second clutch member for operating it into engagement with the first clutch member, means on the stop member engaging the pin to disengage the clutch members on completion of a single revolution of the shaft, a shock absorbing device associated with the stop member to yieldingly receive the impact of the pin, and means operated by the shaft to disconnect the driving means from the carriage while the shaft is in motion.

26. In combination, supporting rails, a carriage mounted to traverse the rails, means to drive the carriage, means to reverse the movement of the carriage at predetermined points of its travel on the rails, a cutting mechanism normally at rest mounted on the carriage, means for connecting the cutting mechanism with the carriage driving means including a device movably mounted on the carriage and operative connections between the device and the cutting mechanism, members secured to one of the supporting rails for automatically actuating said device at points adjacent the extremes of movement of the carriage, a member on the carriage adapted to be manually operated and operative connections between said member and the cutting mechanism to cause the connection thereof with the carriage driving means when the member is manually operated.

27. In combination, a carriage, a shaft mounted therein, arms eccentrically mounted at their ends on the shaft, a shear blade connected to and between the opposite ends of the arms, a relatively fixed shear blade coöperating with the first shear blade, a clutch member loosely mounted on the shaft, means to drive the clutch member, a second clutch member splined on the shaft, a rod connected to the second clutch member and movably mounted in the carriage, a manually operable lever pivotally mounted on the carriage engaging against the end of the rod to cause engagement of the clutch members, and means to automatically disengage the clutch members on completion of a single rotation of the shaft.

28. In combination, a carriage, front and rear supporting rails therefor, means to drive the carriage over the rails, means to reverse the movement of the carriage at predetermined points of its travel over the rails, a cutting mechanism normally at rest on the carriage, means to connect the cutting mechanism with the carriage driving means including a longitudinally movable rod, a lever mounted on the carriage engaging with the rod whereby it may be manually moved, a bell crank lever pivotally connected to the carriage having one arm contacting with the end of the rod, a vertical rod slidably mounted on the carriage contacting at its upper end with the other arm of the lever, and members supported on the front rail for elevating the vertical rod automatically as the travel of the carriage brings the said rod to the members.

29. In combination, a carriage, supporting rails therefor, means to drive the carriage over the rails, means to reverse the movement of the carriage at predetermined points of the travel of the carriage over the rails, upper and lower pairs of rolls mounted in the carriage, means to drive the rolls including a shaft, gearing connections between the shaft and the lower pair of rolls, separable gearing connections between the shaft and the upper pair of rolls including clutch members on the shaft normally held in engagement, a cutting mechanism normally at rest carried by the carriage, means to connect the cutting mechanism with the carriage driving means including a longitudinally movable rod, a lever mounted on the carriage having one end operatively connected with a clutch member on said shaft, means mounted on the carriage having operative engagement with the rod and lever for simultaneous operation thereof to disconnect the clutch members and connect the driving means with the cutting mechanism, and means operated by the movement of an element of the cutting mechanism disconnecting the driving means from the carriage.

30. In combination, a carriage, a shaft extending lengthwise thereof, supporting rails, gearing connections between the shaft and rails, a drive shaft extending lengthwise of one of the rails, a second shaft carried by the carriage transversely thereof, gearing connections between the longitudinal and transverse shafts including means to reverse the drive of the longitudinal shaft from the transverse shaft, a clutch member driven by the drive shaft, a companion clutch member on the transverse shaft, a housing on the transverse shaft, and a spring within the housing normally engaging the companion clutch member to force it into engagement with the first clutch member.

31. In combination, a carriage, a shaft extending lengthwise thereof, supporting rails, gearing connections between the shaft and rails, a drive shaft extending lengthwise of the rails, a second shaft mounted on the carriage transversely thereof, means to drive the transverse shaft by the drive shaft, spaced apart bevel pinions loosely mounted on the transverse shaft, a bevel gear on the longitudinal shaft engaged by both pinions, clutch members on the pinions, a two-faced clutch splined on the transverse shaft, means normally tending to place the two-faced clutch in central position out of engagement with the clutch members, means including dogs carried on the front of the carriage to hold the two-faced clutch in engagement with either clutch member, a rock shaft, pins projecting therefrom under the dogs, and a manually operable element carried on the front of the carriage associated with the rock shaft to turn it, thereby elevating the dogs and releasing the two-faced clutch for return to central position.

In testimony whereof I affix my signature in presence of two witnesses.

HARRY A. SHIELDS.

Witnesses:
FRANK E. LIVERANCE,
H. H. YARRINGTON.

Copies of this patent may be obtained for five cents each, by addressing the "Commissioner of Patents, Washington, D. C."